(12) United States Patent
Wang (10) Patent No.: US 6,493,388 B1
(45) Date of Patent: Dec. 10, 2002

(54) RATE CONTROL AND BUFFER PROTECTION FOR VARIABLE BIT RATE VIDEO PROGRAMS OVER A CONSTANT RATE CHANNEL

(75) Inventor: Limin Wang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/553,457

(22) Filed: Apr. 19, 2000

(51) Int. Cl.[7] ................................................. H04N 7/12
(52) U.S. Cl. ................................................. 375/240.12
(58) Field of Search ........................... 348/385.1, 388.1, 348/389.1; 370/465, 468, 477, 538; 375/240.01–240.03, 240.12–240.16, 240.24, 240.25; 382/232, 236, 238; H04N 7/12, 7/58

(56) References Cited

U.S. PATENT DOCUMENTS

| | | | |
|---|---|---|---|
| 5,216,503 A | | 6/1993 | Paik et al. |
| 5,502,494 A | * | 3/1996 | Auld ..................... 375/240.25 |
| 5,506,844 A | | 4/1996 | Rao |
| 5,708,664 A | | 1/1998 | Budge et al. |
| 5,805,220 A | | 9/1998 | Keesman et al. |
| 5,963,256 A | | 10/1999 | Tahara |
| 6,038,256 A | | 3/2000 | Linzer et al. |
| 6,151,362 A | * | 11/2000 | Wang ..................... 375/240.12 |
| 6,167,084 A | * | 12/2000 | Wang et al. ........... 375/240.02 |
| 6,208,759 B1 | * | 3/2001 | Wells .......................... 382/232 |
| 6,243,417 B1 | * | 6/2001 | Obikane et al. ....... 375/240.12 |

FOREIGN PATENT DOCUMENTS

| | | |
|---|---|---|
| WO | WO 97/47128 | 12/1997 |
| WO | WO 00/13419 | 3/2000 |

OTHER PUBLICATIONS

Wang, Limin et al., "Bit Allocation for Joint Coding of Multiple Video Programs," SPIE VCIP, vol. 3024, pp. 149–158, Feb. 1997.

Test Model 5, ISO/IECJTC1/SC29/WG11, Document AVC–491, Apr. 1993, pp. 61–65.

Wang, Limin et al., "Bit Allocation and Constraints for Joint Coding of Multiple Video Programs," IEEE Transactions on Circuits and Systems for Video Technology, vol. 9, No. 6, Sep. 1999, pp. 949–959.

Hong, Sung–Hoon et. al., "Joint Video Coding of MPEG–2, Video Programs for Digital Broadcasting Services," IEEE Transactions on Broadcasting, vol. 44, No. 2, Jun. 1998, pp. 153–164.

Koo, Irene et al., "Joint MPEG–2 Coding for Multi–Program Broadcasting of Per–Recorded Video," 1999 IEEE International Conference on Acoustics, Speech, and Signal Processing, Mar. 1999, XP–02180780, pp. 2227–2230.

Sorial, Hani Z. et al., "Joint Transcoding of Multiple MPEG Video Bitstreams," IEEE International Symposium on Circuits and Systems, May 30–Jun. 2, 1999, XP–002174270, pp. 251–254.

* cited by examiner

*Primary Examiner*—Richard Lee
(74) *Attorney, Agent, or Firm*—Barry R. Lipsitz (57) ABSTRACT

A system for rate control and buffer management during coding of multiple variable bit rate digital video programs over a constant bit rate channel. The system is suitable for use in a hierarchical bit allocation scheme that includes a super group of pictures (GOP) level, a super frame level, and a frame level. For each super GOP with a length N frames, for each video program, the transmission rate for the current frame is set according to an average number of compressed bits for at least N previous frames, including a frame starting at N'+N−1 frames before the current frame, a frame ending at N' frames before the current frame, and intermediate frames therebetween. N' is a decoding delay of a modeled decoder that receives a respective video program. Moreover, the transmission rates of future frames are pre-set so that the average input rate of each individual video stream to the respective decoder buffer is equal to the average output rate, and the total transmission rate of programs is equal to the channel rate.

24 Claims, 6 Drawing Sheets

RATE CONTROL AND BUFFER PROTECTION FOR VARIABLE BIT RATE VIDEO PROGRAMS OVER A CONSTANT RATE CHANNEL

BACKGROUND OF THE INVENTION

The present invention relates to rate control and buffer management during coding of digital video programs. In particular, the invention discusses rate control and buffer protection issues for transmitting multiple VBR (variable bit rate) video programs over a constant-rate channel.

In a multi-program transmission environment, several programs (e.g., channels) are coded, multiplexed and transmitted over a single communication channel. Since these programs share a limited channel capacity, the aggregate bit rate of the programs must be no greater than the communication channel rate. This can be achieved by controlling either each individual program bit rate using independent coding, or the aggregate bit rate using statistical multiplexing, also known as joint coding.

Moreover, video materials such as films and the like may be pre-compressed and stored for subsequent transmission. This presents difficulties when the stat mux attempts to integrate the pre-compressed program bit streams with the raw, uncompressed digital video sequences.

Additionally, it is necessary to ensure that the encoder and decoder buffers do not overflow or underflow.

Accordingly, it would be desirable to have a rate control and buffer protection system that addresses the above and other concerns. The system should be compatible with dynamic bit allocation strategies for joint coding of multiple video programs which assign a target bit rate for each program on a frame-by-frame basis according to the program's relative complexity. The system should predetermine the transmission rates of future frames so that the average input rate of each individual video stream to the respective decoder buffer is equal to the average output rate, and the total transmission rate of all programs is equal to the channel rate. The system should enable the upper and lower bonds of the encoder and decoder buffers to be measurable at the encoding end at the current frame instant.

The present invention provides a rate control and buffer protection system that provides the above and other advantages.

SUMMARY OF THE INVENTION

The present invention relates to rate control and buffer management during coding of digital video programs.

A system is presented for rate control and buffer management during coding of multiple variable bit rate digital video programs over a constant bit rate channel. Buffer fullness is modeled on a frame-by-frame basis. Buffer protection is achieved by applying additional constraints on the target rates. For encoder buffer protection, we set the upper and lower bounds for the aggregate rate of programs. For decoder buffer protection, we limit the dynamic range of each individual program rate. Both the upper and lower bounds are time-varying functions (i.e., on a frame-by-frame basis). We also pre-set the future transmission rates so that the average input rate of each individual video stream to the respective decoder buffer is equal to the average output rate, and the total transmission rate of programs is equal to the channel rate. With the pre-settings of future transmission rates for the above two conditions, the upper and lower bounds for decoder buffer protection become measurable at the current frame instant, which allows decoder buffer protection to be managed at the encoding end. The system is suitable for use in a hierarchical bit allocation scheme that includes a super group of pictures (GOP) level, a super frame level, and a frame level.

A particular method for coding a plurality L of variable bit rate video programs includes the step of allocating bits for coding the video programs according to a hierarchical scheme that includes at least: (a) a super group of pictures (GOP) level, wherein a super GOP comprises at least one GOP from each of the video programs, and has a length of N frames, and (b) a frame level. For each lth program, a transmission rate is set for the respective current nth frame according to an average number of compressed bits for at least N previous frames, including a frame starting at $N'+N-1$ frames before the current frame, a frame ending at $N'$ frames before the current frame, and intermediate frames therebetween. $N'$ is a decoding delay of a modeled decoder that receives a respective video program.

As an example, with a super GOP length of N=45 frames, and a decoding delay of $N'$=15 frames, the transmission rate may be set based on an average number of compressed bits for 45 previous frames, including a frame starting at 59 frames before the current frame, and a frame ending at 15 frames before the current frame.

A corresponding apparatus is also presented.

DETAILED DESCRIPTION OF THE INVENTION

The present invention relates to rate control and buffer management during coding of digital video programs.

A dynamic bit allocation strategy for joint coding of multiple video programs has been discussed in L. Wang and A. Vincent, "Bit allocation and constrains for joint coding of multi-program transmission", IEEE Trans. on Circuits and Systems for Video technology, vol. 9, pp. 949–959, October 1999. This dynamic bit allocation strategy assigns a target rate for each program on a frame-by-frame basis according to the program relative complexity, which results in a relatively uniform quality among programs as well as within a program.

Buffer protection is provided for a dynamic bit allocation strategy for joint coding of multiple video programs by applying additional constraints on the target bit rates for the pictures. For encoder buffer protection, the constraints are applied on the aggregate rate only, while for decoder buffer protection, the constraints need to be imposed on each individual program rate. It is shown that decoder buffer protection requires control of transmission rates for future frames. These future transmission rates are predetermined so that the average input rate of each individual video stream to the respective decoder buffer is equal to the average output rate, and the total transmission rate of programs is equal to the channel rate. With the pre-settings on future transmission rates, the upper and lower bounds become measurable at the encoding end at the current frame instant.

1. Introduction

Figure 1:
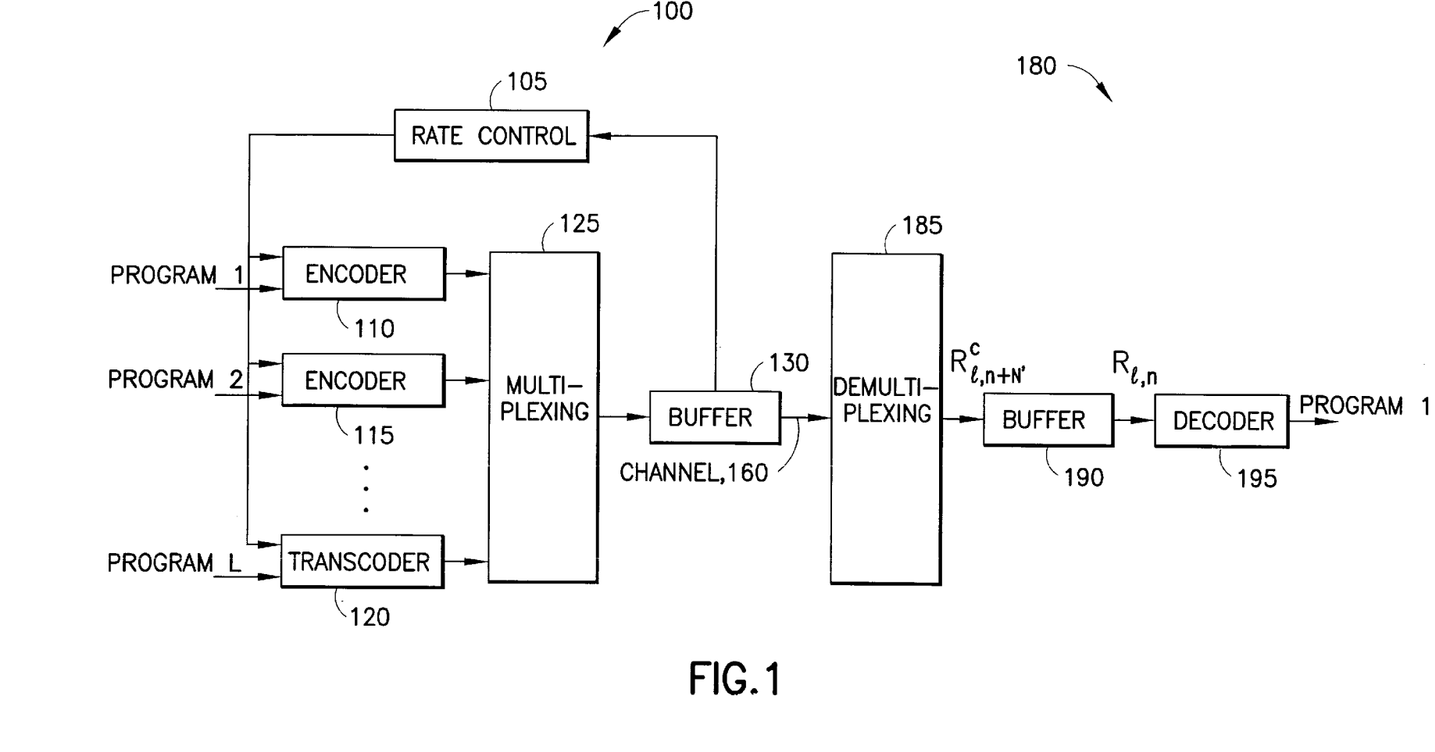
FIG. 1 illustrates an encoder/decoder in accordance with the present invention.

FIG. 1 shows an encoding end 100, a constant rate channel 160, and a decoding end 180, which may be a subscriber terminal (set-top box), a personal computer, or other appliance at an end-user's location.

At the encoding end 100, it is assumed that a number of uncompressed video programs (program 1, program 2) are provided to respective encoders 110, 115. Optionally, one or more already-compressed bit streams, such as program L, may be provided to respective transcoders, such as transcoder 120. The terms coding, encoding and the like are used herein to refer to processing of both uncompressed and compressed video programs. Uncompressed programs are coded for the first time, while compressed programs are re-encoded, typically at a different bit rate.

The encoders 110, 115 and transcoders 120 encode the respective data according to a target bit rate assigned by a rate control function 105. The encoded data is provided to a mux 125, and to a buffer 130 for transmission across the constant rate channel 160 to the decoding end 180.

At the decoding end 180, the packets of a selected program are extracted and decoded. Specifically, the transmission is received at a demux 185 and provided to a buffer 190 at a data rate of $R^c_{1,n+N'}$. The buffer 190 outputs data at a rate $R_{l,n}$ to a decoder 195 to provide a decoded program, termed generically as program 1. $R^c_{l,n+N'}$, denotes the number of coded bits received from the channel for program 1 during the (n+N')th frame period (i.e., between the frame instants of n+N' and n+N'+1—discussed further in connection with FIG. 5), where n is a super frame index and N' is a decoding delay, e.g., the delay from the input to the encoder buffer to the output of the decoder buffer. Rl,n denotes the number of bits for an nth frame period for an lth program In a multi-program transmission environment, the several video programs 1, . . . , L are squeezed into the single constant-rate channel 160, as shown in FIG. 1. Clearly, these programs will have to share the channel capacity. This can be achieved by controlling either each individual program rate (independent coding) or the aggregate rate (joint coding). Unlike independent coding, joint coding extends the control to an additional dimension, that is, the program dimension. This gives more freedom in allocating the channel capacity over programs and, therefore, more control of the program quality. In fact, joint coding is more efficient and effective than independent coding.

Joint coding controls only the aggregate rate while allowing each individual rate to vary. Hence, each individual video bit streams behaves more or less like VBR video. The main merit of VBR video is constant quality. In fact, one of the necessary conditions for maximizing the overall quality is to have an equal quality for all the programs.

The aforementioned paper by L. Wang et al. proposes a dynamic bit allocation strategy for joint coding that dynamically allocates the available coding bits among the programs according to the program relative complexities. This means that more complex programs are assigned more bits and less complex programs are assigned fewer bits. Moreover, given a constant-rate channel, the rate assigned for a program depends on not only the program's own complexity, but also the complexity of other programs. Specifically, each encoder receives a target rate for each input frame from the rate control engine. The encoder then tries to meet the target rate by adjusting coding parameters, such as quantization parameter. The resulting statistics, such as the average quantization parameter used for a frame, the number of compressed bits generated for the frame, as well as buffer fullness, are then sent back to the rate control engine. With the updated information, the rate control engine determines a new set of target rates for the upcoming, future frames. To smooth out the variations in rates of compressed video bit streams, buffers are inserted between the encoding end and the channel, and between the channel and the decoding end, as shown in FIG. 1. This bit allocation strategy results in relatively uniform quality among programs as well as within a program—a typical feature of VBR video.

However, it is also the responsibility of the encoding/transmission end to prevent both the encoder and decoder buffers from overflowing or underflowing. Buffer protection for VBR video is a much more challenging issue than for CBR (Constant Bit Rate) video. For CBR video, as long as the encoder buffer never overflows or underflows, the decoder buffer is safe. However, the same theory does not apply to VBR video. In general, buffer protection for VBR video is application-oriented.

The present invention provides buffer modeling and protection for transmitting multiple VBR videos over a constant-rate channel. The fullness of encoder and decoder buffers is modeled on a frame-by-frame basis. Based on the models, we deduce the analytic upper and lower bounds for the target rates determined by the dynamic bit allocation. The upper and lower bounds for encoder buffer protection apply to the aggregate rate only. However, for decoder buffer protection, we need to limit the dynamic range of each individual bit rate. Both the upper and lower bounds are time-varying functions (i.e., on a frame-by-frame basis). As long as the aggregate rate and the individual rates are all within their corresponding upper and lower bounds, the encoder and decoder buffers will never overflow or underflow.

It is further shown that the upper and lower bounds for decoder buffers require information regarding the transmission rates of future frames. We predetermine these future transmission rates so that the following two conditions are met:

1. the average input rate of each individual video stream to the respective decoder buffer is equal to the average output rate, and
2. the total transmission rate of programs is equal to (or smaller than) the channel rate.

The first condition is for correct decoding, and the second is for reliable transmission of the compressed bits. With the pre-settings of the future transmission rates for the above two conditions, we produce upper and lower bounds measurable at the encoding end at the current frame instant. This allows decoder buffer protection to be addressed at the encoding end.

In the following section, we will briefly overview the bit allocation strategy presented in the aforementioned paper by L. Wang et al. In section 3, we discuss buffer modeling and protection issues for both encoder and decoder.

2. Dynamic Bit Allocation

The dynamic bit allocation scheme presented in the aforementioned paper by L. Wang et al. is of a hierarchical nature. At the very top level of hierarchy, the input programs are conceptually divided into super GOPs with the same number of I-, P- and B-pictures. Here, we have assumed that the encoders in FIG. 1 are MPEG-2 encoders (ISO/MPEG II (DIS 13818-2), "Generic Coding Of Moving Pictures And Associated Audio", March 1994). Since the super GOPs contain the same number of I, P and B pictures, they are assigned the same nominal number of bits. A super frame is then defined at each frame instant as a collection of frames, one from each of programs at the same frame instant. A super frame is assigned a target rate according to the super frame relative complexity measures. The target rate of a super frame is then distributed over the frames within the super frame according to the frame complexities. The three-step bit allocation strategy is summarized below.

2.1 Super GOP and Nominal Rate

Figure 2:
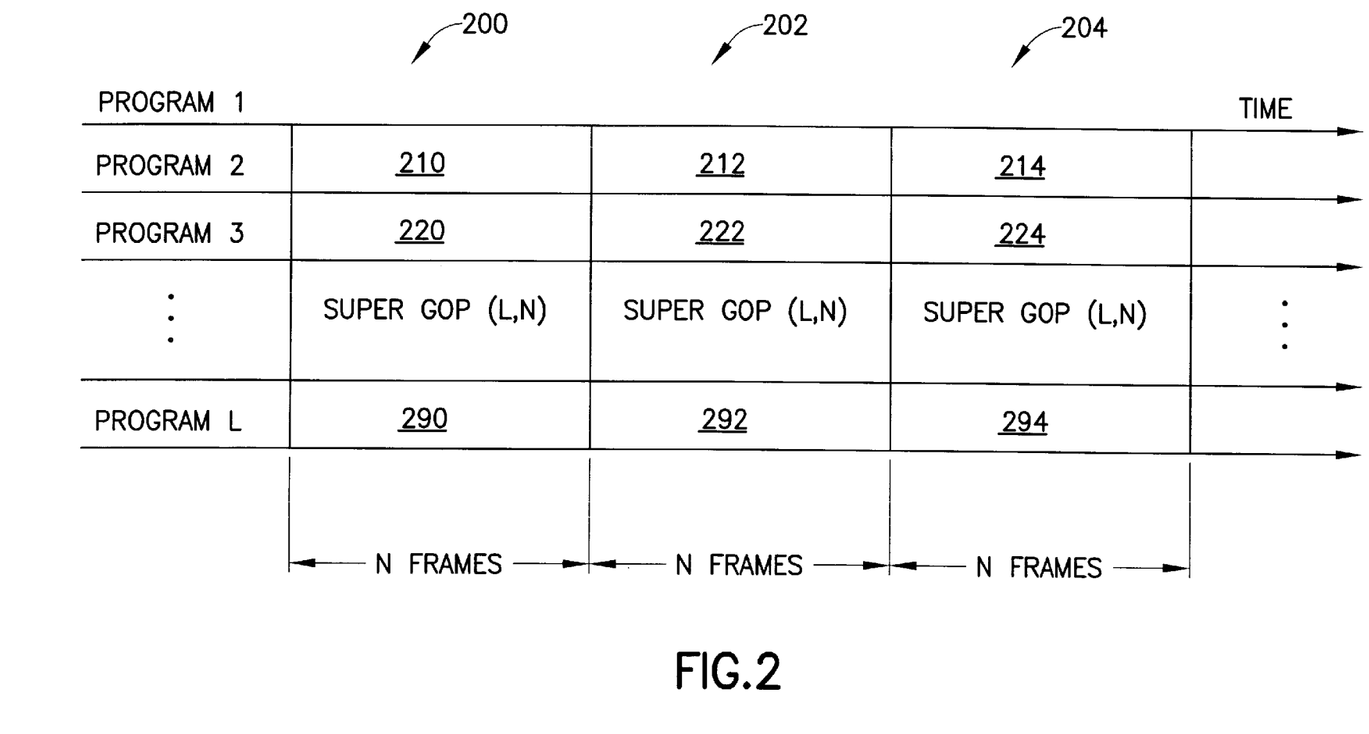
FIG. 2 illustrates a super group-of-pictures (GOP) construct in accordance with the present invention.

FIG. 2 illustrates a super group-of-pictures (GOP) construct in accordance with the present invention. The L programs are conceptually divided into super GOPs(L,N), where L is the number of programs and N is the Least Common Multiple of program GOP lengths.

A first super GOP 200 includes data frames from program 1 (210), program 2 (220), . . . , through program L (290). Each program segment, e.g., 210, 220, 290, contains a number of complete frames from one or more GOPs as discussed further in connection with FIG. 2. A second super GOP 202 includes data frames from program 1 (212), program 2(222), . . . , through program L (292). A third super GOP 204 includes data frames from program 1 (214), program 2 (224), . . . , through program L (294).

Assume that there are L input video programs that can be (MPEG) encoded with any GOP structure. We conceptually divide the L programs into identical super GOPs(L,N) in terms of the number of frames of each picture type. Here, L is the number of programs, which is given, and N is the length of super GOPs, which is set equal to the Least Common Multiple (LCM) of the program GOP lengths of $N_l$, l=1,2, . . . ,L, i.e., $$N = LCM(N_1, N_2, \ldots, N_L) \quad (1)$$

For example, considering only two different GOP lengths for N programs, say nine and fifteen, the super GOP length N=45. Since all super GOPs(L,N), with N defined in (1), contain the same number of I, P and B pictures, they are assigned the same nominal number of bits, $T_{L \times N}$, i.e., $$T_{L \times N} = (L \times N) \cdot R_{channel(bpf)} \quad (2)$$

where $R_{channel(bpf)}$ is the channel rate in the average number of bits per (regular) frame.

2.2 Super Frame and Target Rate

Figure 3:
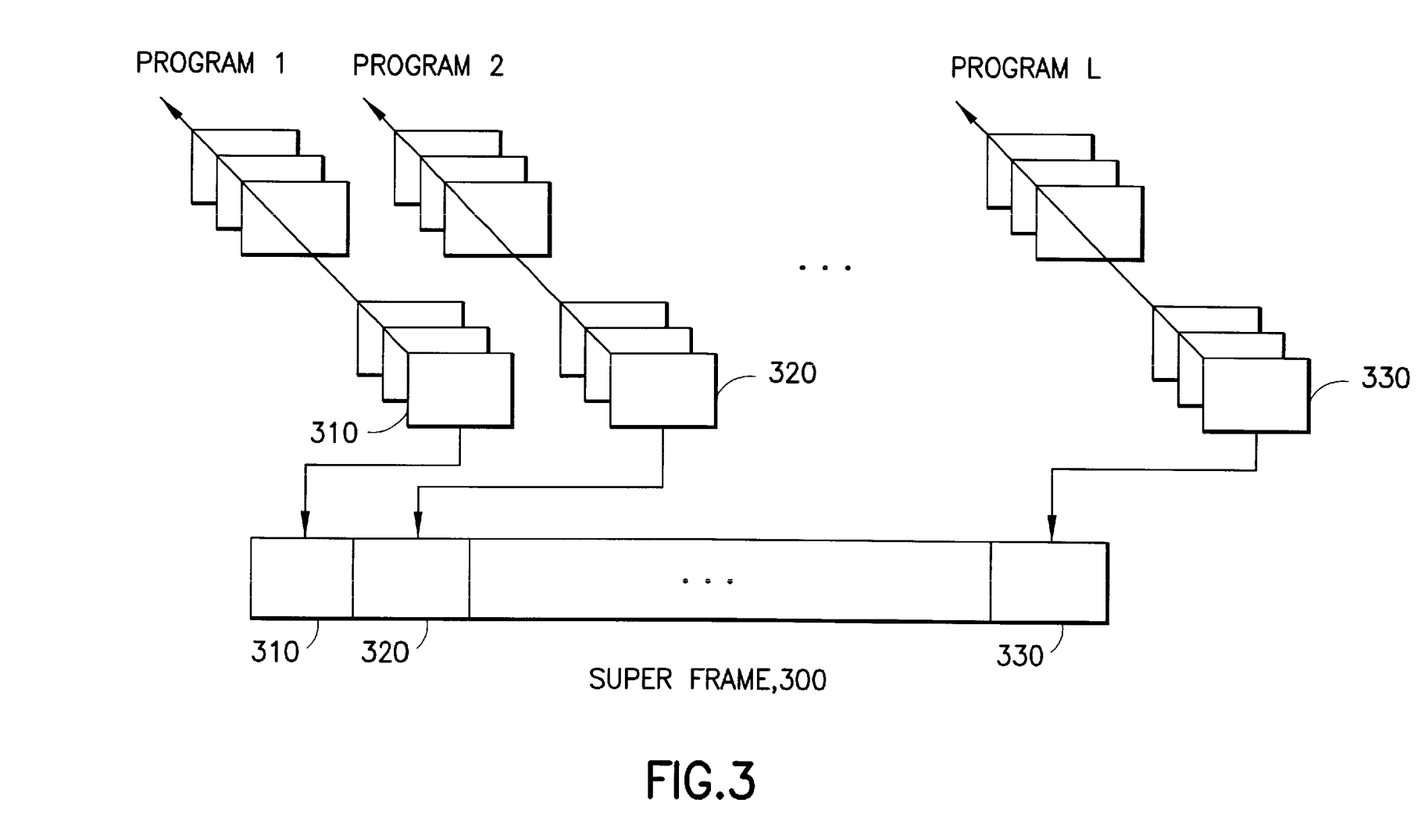
FIG. 3 illustrates a super frame construct in accordance with the present invention.

FIG. 3 illustrates a super frame, which is a collection of L frames, one from each of L programs at the same time instant.

At each frame instant n, we can further imagine a super frame 300, which is a collection of L frames or pictures, one from each of the L programs taken at the same frame instant. For example, frame 310 from program 1, frame 320 from program 2, . . . , through frame 330 of program L are conceptually arranged in the super frame 300. Clearly, a super GOP consists of N super frames. Moreover, since these L programs may have different GOP structures, the L frames in a super frame can have different picture types.

The target number of bits for super frame n is given as, $$T_n = \frac{\sum_{l=1}^{L} \alpha_l \beta_l \gamma_{l,n,t} C_{l,n,t}}{\sum_{l=1}^{L} [n_{l,I} \alpha_l \beta_l \gamma_I C_{l,I} + n_{l,P} \alpha_l \beta_l \gamma_P C_{l,P} + n_{l,B} \alpha_l \beta_l \gamma_B C_{l,B}]} R \quad (3)$$

where:
1. $C_{l,n,t}$ is the complexity measure for frame n of program 1 with picture type t∈{I,P,B}, and it can be either $C_{l,I}$, $C_{l,P}$ or $C_{l,B}$ depending upon the associated picture type of I, P or B, respectively.
2. $\alpha_l$ is a factor for addressing the spatial resolution of program 1. The frame spatial resolution or frame size can be different for different programs. This factor addresses this difference.
3. $\beta_l$ is the quality (or priority) weighting factor for program 1, which is determined by the program provider.
4. $\gamma_{l,n,t}$ is a constant factor used to compensate for the picture type t∈{I,P,B} of frame n of program 1. It can be either $\gamma_I$, $\gamma_P$ or $\gamma_B$, depending upon the picture type I, P or B, respectively.
5. $n_{l,I}$, $n_{l,P}$, $n_{l,B}$ and are, respectively, the remaining number of I, P and B pictures for program 1 in the current super GOP.
6. R is the remaining number of bits for the current super GOP, defined as $R = R - \sum_{l=1}^{L} R_{l,n-1}$. Furthermore, for each new super GOP, R is updated as $R = R + T_{L \times N}$.

The numerator on the right side of the equation (3) is the sum of complexity measures for all the frames in super frame n, and can be considered to be the complexity measure for the super frame. The denominator is the sum of complexity measures for all the remaining frames in the current super GOP. Hence, a super frame is assigned a target rate proportional to the super frame's complexity measure.

2.3 Target Rate For Regular Frame

Given a target number of bits for a super frame n, $T_n$ the target number of bits for (regular) frame n of program 1 within the super frame, $T_{l,n}$ can be calculated as, $$T_{l,n} = \frac{\alpha_l \beta_l \gamma_{l,n,t} C_{l,n,t}}{\sum_{l=1}^{L} \alpha_l \beta_l \gamma_{l,n,t} C_{l,n,t}} T_n \quad (4)$$

where the numerator on the right is the complexity measure for frame n of program 1 and the denominator is the complexity measure for super frame n. Hence, a frame is assigned a target rate proportional to its complexity measure.

3. Buffer Modeling and Protection

The bit allocation strategy assigns a regular frame a target rate based upon the frame complexity measure, the picture type, the program GOP structure, the program resolution, the program priority, as well as information from other programs. In general, more bits are allocated to higher complexity programs and fewer bits are allocated to lower complexity programs. Joint coding with dynamic bit allocation results in relatively uniform quality among programs as well as within program, as compared to independent coding.

Program complexity can vary significantly from program to program, and the scene content of a program can also change considerably as a function of time. Hence, bit allocation over programs will be a time-varying function. In other words, programs are encoded at variable rates. To smooth out the variations in bit rates, an encoder buffer 130 is inserted between the encoders and the channel, and a decoder buffer 190 is inserted between the channel and the decoder, as shown in FIG. 1. Since the buffer sizes are limited, there is a need to prevent overflowing and/or underflowing for correct decoding of the compressed bits. It is the responsibility of the encoding/transmission end to guarantee the safety of both the encoder and decoder buffers. This can be achieved in accordance with the present invention by applying additional constraints on the target rates of programs determined by dynamic bit allocation strategy. We now discuss these constraints in the following subsections.

3.1 Encoder Buffer Modeling and Protection

Assume that the compressed bits for the nth frames of programs, $\Sigma_{l=1}^{L} R_{l,n}$, are moved into the encoder buffer 130 at the frame instant of n instantaneously. That is, we assume there is no time needed to move the bits of a frame into the encoder buffer, or to move the bits of a frame out of the decoder buffer. Here, $R_{l,n}$ is the number of compressed bits for frame n of program 1. We may also call $R_{l,n}$, the encoding rate for program 1 as it is the rate generated for program 1 from the encoder. Let $B_n^e$ be the encoder buffer fullness at the frame instant n before the compressed bits of the nth frames, $\Sigma_{l=1}^{L} R_{l,n}$, are moved into the buffer 130, as shown in FIG. 4.

Figure 4:
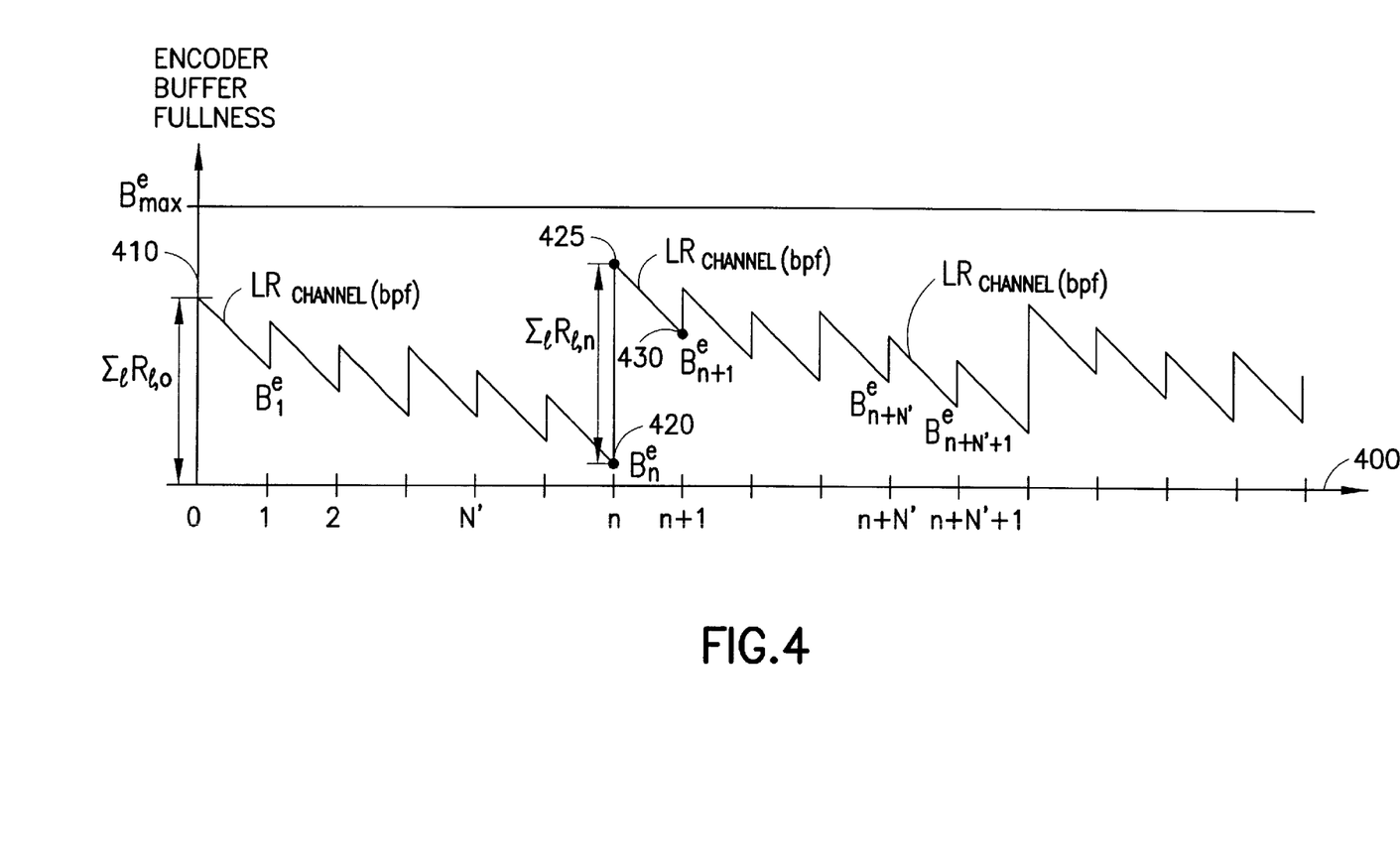
FIG. 4 illustrates a plot of encoder buffer fullness vs. time in accordance with the present invention.

FIG. 4 shows a time-varying encoder buffer fullness. The horizontal axis 400 is a frame or time index, while the vertical axis 410 shows the encoder buffer fullness $B^e$ (e.g., in units of bits)

The buffer fullness at the frame instant of n after the compressed bits of $\Sigma_{l=1}^{L} R_{l,n}$ are moved into the buffer (point 425) is therefore equal to $B_n^e + \Sigma_{l=1}^{L} R_{l,n}$ (increased from point 420), which is a local maximum and has to be equal to, or smaller than, the maximum buffer size, $B_{max}^e$, i.e., $$B_n^e + \sum_{l=1}^{L} R_{l,n} \leq B_{max}^e \quad (5)$$

Then, up to the next frame instant of n+1, there are no bits moving into the buffer, but $LR_{channel(bpf)}$ bits are moving out the buffer. Note that $LR_{channel(bpf)}$ is always constant because the channel rate is constant. The encoder buffer fullness, right before the frame instant of n+1 (point 430), is therefore $B_n^e + \Sigma_{l=1}^{L} R_{l,n} - LR_{channel(bpf)}$, which represents a local minimum and has to be equal to, or greater than, zero, i.e., $$0 \leq B_n^e + \sum_{l=1}^{L} R_{l,n} - LR_{channel(bpf)} \quad (6)$$

From (5) and (6), we have $$LR_{channel(bpf)} - B_n^e \leq \sum_{l=1}^{L} R_{l,n} \leq B_{max}^e - B_n^e \quad (7)$$

This is a constraint on the total number of bits generated for the nth frames of programs for a given channel rate, $R_{channel(bpf)}$. With an accurate rate control, the aggregate rate for the nth frames should be close to the target rate assigned for super frame n (eqn. 3), i.e., $$\sum_{l=1}^{L} R_{l,n} \Rightarrow T_n \quad (8)$$

The constraint on the total number of bits for the nth frames of programs can therefore be translated into the constraint on the target rate for super frame n, i.e., $$LR_{channel(bpf)} - B_n^e \leq T_n \leq B_{max}^e - B_n^e \quad (9)$$

Hence, before further distributing the target rate assigned for a super frame, say $T_n$, over the frames within the super frame, we need to check if $T_n$ is in the proper range, and if not, we adjust it as follows $$T_n = \begin{cases} LR_{channel(bpf)} - B_n^e & \text{if} \quad T_n < LR_{channel(bpf)} - B_n^e \\ B_{max}^e - B_n^e & \text{if} \quad T_n > B_{max}^e - B_n^e \\ T_n & \text{otherwise} \end{cases} \quad (10)$$

Advantageously, all the terms in the upper and lower bounds for $T_n$ (eqn. 9) are measurable at the frame instant of n at the encoding end.

3.2 Decoder Buffer Modeling and Protection

Figure 5:
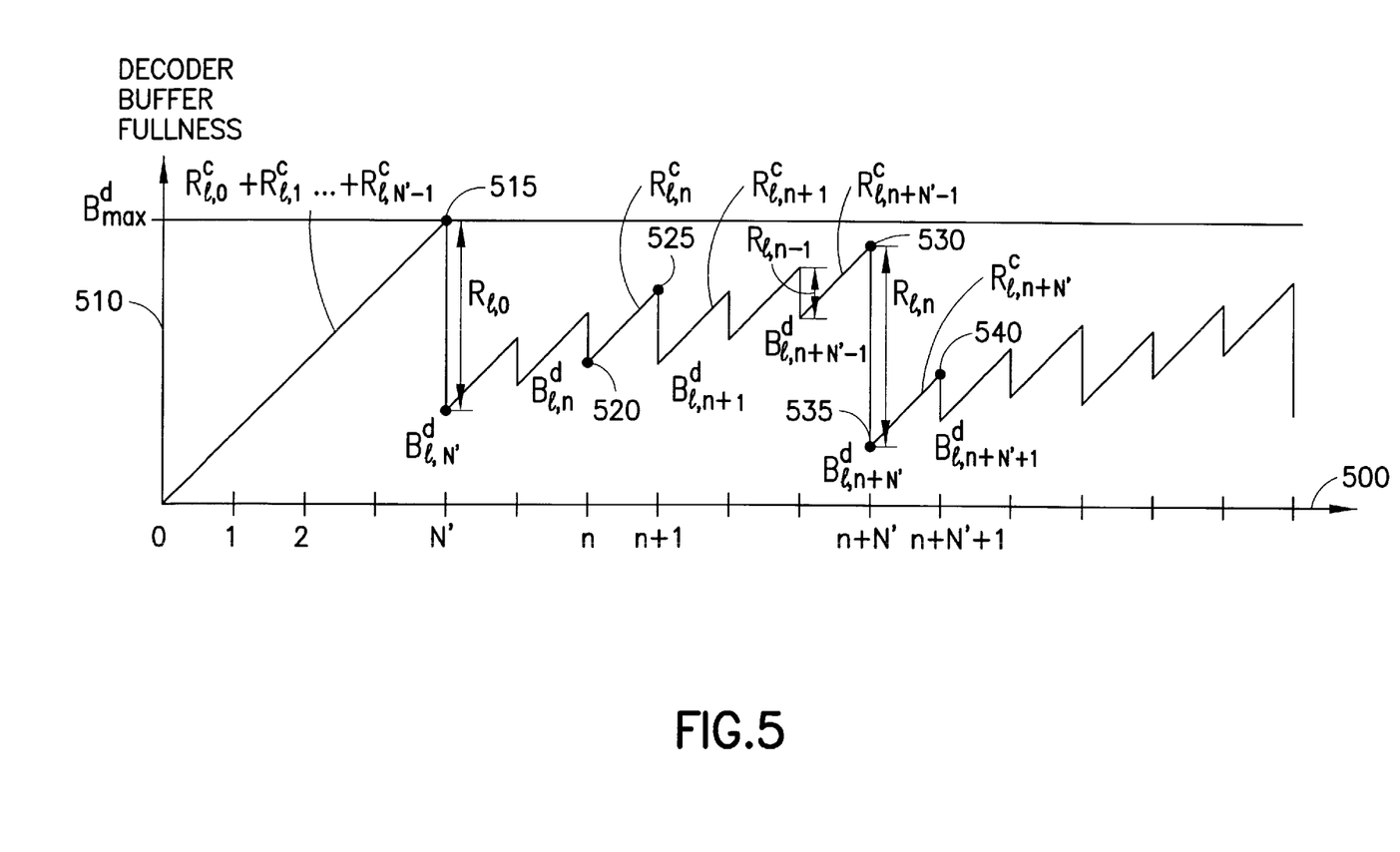
FIG. 5 illustrates a plot of decoder buffer fullness vs. time in accordance with the present invention.

FIG. 5 shows a time-varying decoder buffer fullness. The horizontal axis 500 is a frame or time index, while the vertical axis 510 shows the decoder buffer fullness $B^d$ (e.g., in units of bits).

Assume that program 1 is selected at the decoding end (FIG. 1) and that the decoding delay is N' frames. Let $R_{l,n}^c$ be the number of bits transmitted for program 1 during the nth frame period (between points 520 and 525), as shown in FIG. 5. We may also call $R_{l,n}^c$ the transmission rate for program 1 as it is the rate transmitted over the network for program 1. Note that the transmission rate for program 1 during the nth frame period may not be the same as the encoding rate for frame n, i.e., $R_{l,n}^c \neq R_{l,n}$.

Moreover, initially, due to the delay of N' frames, the decoder buffer will be filled up to $\Sigma_{n=0}^{N'-1} R_{l,n}^c$, which does not necessarily equal $B_{max}^d$, before any bits are moved out (see point 515). $B_{max}^d$ has to hold the bits for N' frames before any bits are moved out the buffer.

At the frame instant of n+N' (point 530), the compressed bits for frame n, $R_{l,n}$, are moved out the decoder buffer (at point 530) and moved into the decoder instantaneously (to point 535), and between the frame instants of n+N' and n+N'+1, the decoder buffer receives $R_{l,n+N'}^c$ bits from the network (FIGS. 1 and 5). Note that, for program 1, the transmission rates during the nth frame period and some other arbitrary mth frame period may not be the same, i.e., $R_{l,n}^c \neq R_{l,m}^c$ for $n \neq m$.

Let $B_{l,n+N'}^d$ be the decoder buffer fullness at the frame instant of n+N' after the compressed bits for frame n are moved out (point 535). Clearly, $B_{l,n-N'}^d$ is a local minimum and has to be equal to, or greater than, zero (or a non-zero minimum buffer fullness, if applicable), i.e., $$0 \leq B_{l,n-N'}^d \quad (11)$$

Furthermore, the buffer fullness right before the frame instant of n+N'+1 (point 540) is $B_{l,n+N'}^d + R_{l,n+N'}^c$. This is the local maximum and has to be equal to, or smaller than, the maximum decoder buffer size, $B_{max}^d$, that is, $$B_{l,n+N'}^d + R_{l,n+N'}^c \leq B_{max}^d \quad (12)$$

From (11) and (12), we have, $$0 \leq B_{l,n+N'}^d \leq R_{l,n+N'}^c + B_{max}^d \quad (13)$$

The buffer fullness at the frame instant of n+N', $B_{l,n+N'}^d$, (point 535) can be expressed as $$\begin{aligned}
B_{l,n+N'}^d &= B_{l,n+N'-1}^d + R_{l,n+N'-1}^c - R_{l,n} \quad n = 1, 2, \ldots \quad (14)\\
&= B_{l,N'}^d + \sum_{n'=0}^{n-1} R_{l,n'+N'}^c - \sum_{n'=1}^{n} R_{l,n'} \quad (14b)\\
&= \left(\sum_{n'=0}^{N'-1} R_{l,n'}^c - R_{l,0}\right) + \sum_{n'=N'}^{n+N'-1} R_{l,n'}^c - \sum_{n'=1}^{n} R_{l,n'} \quad (14c)\\
&= \sum_{n'=n}^{n+N'-1} R_{l,n'}^c + \left(\sum_{n'=0}^{n-1} R_{l,n'}^c - \sum_{n'=0}^{n-1} R_{l,n'}\right) - R_{l,n} \quad (14d)\\
&= \sum_{n'=n}^{n+N'-1} R_{l,n'}^c - B_{l,n}^e - R_{l,n} \quad (14e)
\end{aligned}$$

where $$B_{l,n}^e = \sum_{n'=0}^{n-1} R_{l,n'} - \sum_{n'=0}^{n-1} R_{l,n'}^c \quad (15)$$

can be considered to be the fullness of a virtual encoder buffer at the frame instant of n for program 1. From (13) and (14), we have $$0 \leq \sum_{n'=n}^{n+N'-1} R_{l,n'}^c - B_{l,n}^e - R_{l,n} \leq -R_{l,n+N'}^c + B_{max}^d \quad \text{or} \quad (16)$$

$$\sum_{n'=n}^{n+N'} R_{l,n'}^c - B_{l,n}^e - B_{max}^d \leq R_{l,n} \leq \sum_{n'=n}^{n+N'-1} R_{l,n'}^c - B_{l,n}^e \quad (17)$$

This is a constraint on the number of bits for frame n of program 1. Again, if the target rate for a frame can be met, the constraint on the rate for a frame can be translated into the constraint on the target rate for the frame (eqn. 4), i.e., $$\sum_{n'=n}^{n+N'} R_{l,n'}^c - B_{l,n}^e - B_{max}^d \leq T_{l,n} \leq \sum_{n'=n}^{n+N'-1} R_{l,n'}^c - B_{l,n}^e \quad (18)$$

Hence, before starting to encode frame n of program 1, we need to check if its target rate is within the proper range, and if not, we adjust it as follows $$T_{l,n} = \begin{cases} \sum_{n'=n}^{n+N'} R_{l,n'}^c - B_{l,n}^e - B_{max}^d & \text{if } T_{l,n} < \sum_{n'=n}^{n+N'} R_{l,n'}^c - B_{l,n}^e - B_{max}^d \\ \sum_{n'=n}^{n+N'-1} R_{l,n'}^c - B_{l,n}^e & \text{if } T_{l,n} > \sum_{n'=n}^{n+N'-1} R_{l,n'}^c - B_{l,n}^e \\ T_{l,n} & \text{otherwise} \end{cases} \quad (19)$$

Note that $B_{l,n}^e$ is the fullness of a virtual encoder buffer for program 1 at the frame instant of n, defined in (15), and it is available at the encoding end at the current frame instant of n. On the other hand, the transmission rates for program 1 during the intervals of the future frames, $R_{l,n'}^c$, n'=n,n+1, ... ,n+N', need to be predetermined. In determining the future transmission rates, we impose two conditions:

1. the average input rate of each individual video stream to the respective decoder buffer equal to the average output rate, and
2. the total transmission rate of L programs equal to (or smaller than) the channel rate.

The first condition is for correct decoding, and the second is for reliable transmission of bits. Specifically, we set the transmission rate for frame n of program 1 equal to the average number of compressed bits for the N previous frames that are most recently moved out the decoder buffer (FIG. 5), i.e., $$R_{l,n'}^c = \frac{1}{N} \sum_{n''=n'-N'-N+1}^{n'-N'} R_{l,n''} \quad n' = n, n+1, \ldots, n+N' \quad (20)$$

where N is the super GOP length. Note that it may be possible to use other numbers of previous frames for the average, e.g., 2N, or averaging over other multiples of N, and so forth. Clearly, this setting of future transmission rates satisfies the first condition, that is, the average input rate to the decoder buffer is equal to the average output rate. It also makes the total transmission rate of L programs for any frame period of n, $$\sum_{l=1}^{L} R_{l,n}^c,$$

equal to the channel rate, $LR_{channel(bpf)}$, that is, $$\begin{aligned}
\sum_{l=1}^{L} R_{l,n'}^c &= \sum_{l=1}^{L} \left( \frac{1}{N} \sum_{n''=n'-N'-N+1}^{n'-N'} R_{l,n''} \right) \quad (21a)\\
&= \frac{1}{N} \left( \sum_{l=1}^{L} \sum_{n''=n'-N'-N+1}^{n'-N'} R_{l,n''} \right) \quad (21b)\\
&= \frac{1}{N} T_{L \times N} = L \frac{1}{N \times L} T_{L \times N} = LR_{channel(bpf)} \quad (21c)
\end{aligned}$$

Figure 6:
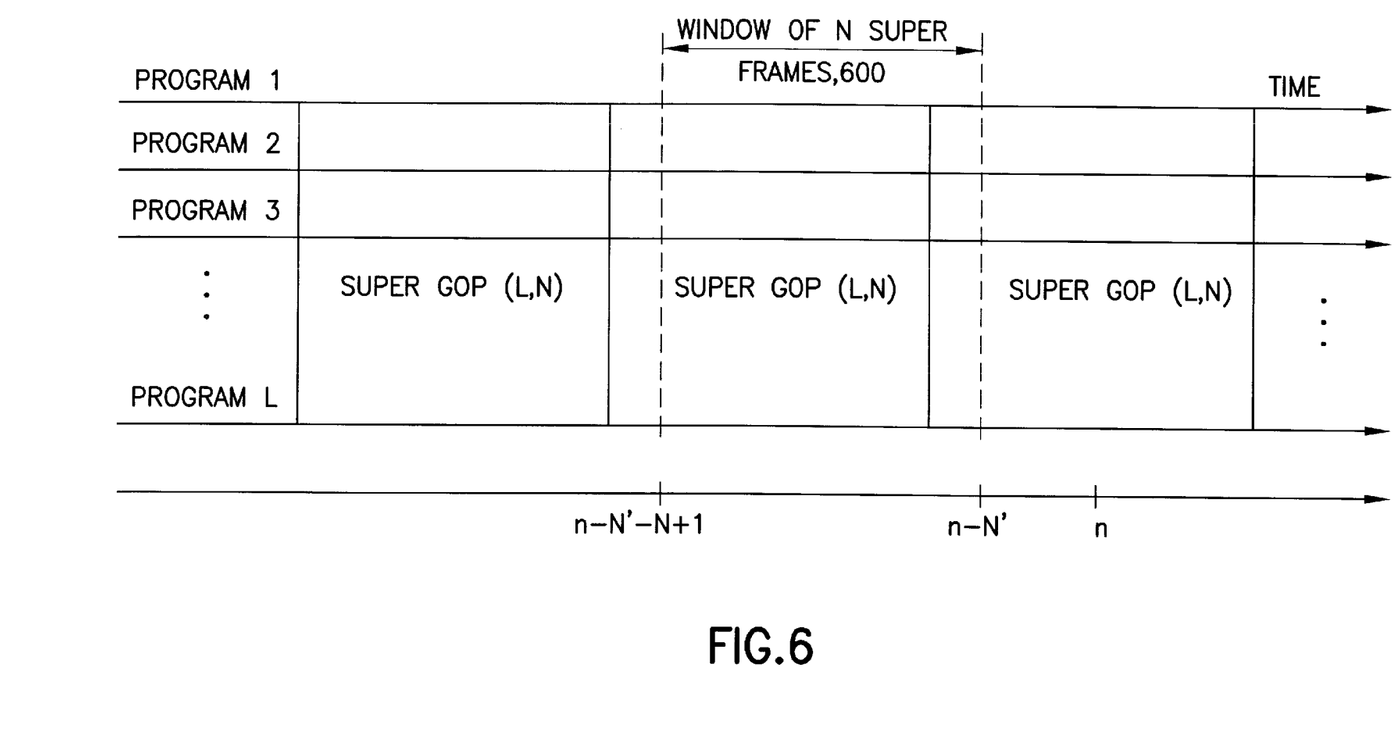
FIG. 6 illustrates a window of N super frames in accordance with the present invention.

Note that the term in the brackets of (21b) is the bits for a window 600 of L×N frames, as shown in FIG. 6. FIG. 6, which is not necessarily to scale, shows a window of N (super) frames that contains the same number of I, P and B pictures. Recall that N' is the decoding delay set by the system, and N is the super GOP length. N' can be greater than, equal to, or less than N. For example, N' may be set to 15 frames, or 0.5 seconds (15 frames×1 sec./30 frames).

Note that the window can be shifted anywhere. N' is a constant no matter where the window is shifted. However, n varies.

No matter how the window is shifted (either left or right), it contains the same numbers of I, P and B pictures, just as a regular super GOP does. Hence, the bits for the frames in the window should be equal to the nominal number for a super GOP, i.e., $T_{L \times N}$ (see eqn. 1).

With the future transmission rates defined in (20), all the terms in the upper bound for frame n of program 1, $$\sum_{n'=n}^{n+N'-1} R_{l,n'}^c - B_{l,n}^e,$$

in (17) and (18) become available at the frame instant of n, or the upper bound can be calculated based upon the information of the previous frames n−1, n−2, . . . . However, in the lower bound of $$\sum_{n'=n}^{n+N'} R_{l,n'}^c - B_{l,n}^c - B_{\max}^d$$

in (17) and (18), the term $R_{l,n+N'}^c = 1/N(R_{l,n-N+1} + \ldots + R_{l,n-1} + R_{l,n})$ requires the information on the number of bits for frame n, $R_{l,n}$, which is not available yet at the frame instant of n. By substituting (20) into the lower bound in (18), we have $$\sum_{n'=n}^{n+N'-1} R_{l,n'}^c + \frac{1}{N}\left(\sum_{n''=n-N+1}^{n-1} R_{l,n''} + R_{l,n}\right) - B_{l,n}^c - B_{\max}^d \le R_{l,n} \quad (22)$$

or $$\sum_{n'=n}^{n+N'-1} R_{l,n'}^c + \frac{1}{N} \sum_{n''=n-N+1}^{n-1} R_{l,n''} - B_{l,n}^c - B_{\max}^d \le \left(1 - \frac{1}{N}\right) R_{l,n} \quad (23)$$

The lower bound for frame n of program 1 can therefore be written as $$\frac{N}{N-1}\left(\sum_{n'=n}^{n+N'-1} R_{l,n'}^c + \frac{1}{N} \sum_{n''=n-N+1}^{n-1} R_{l,n''} - B_{l,n}^c - B_{\max}^d\right) \le R_{l,n} = T_{l,n} \quad (24)$$

where all the associated terms (on the left side of (24)) in the lower bound are now measurable at the frame instant of n at the encoding end.

4. CONCLUSIONS

The present invention addresses buffer modeling and protection issues for transmitting multiple VBR video programs over a constant bit rate channel. Buffer fullness is modeled on a frame-by-frame basis. Buffer protection is achieved by applying additional constraints on the target rates. For encoder buffer protection, we set the upper and lower bounds for the aggregate rate of programs. For decoder buffer protection, we limit the dynamic range of each individual program rate. Both the upper and lower bounds are time-varying functions (i.e., on a frame-by-frame basis). We also pre-set the future transmission rates so that the following two conditions are met:

1. The average input rate of each individual video stream to the respective decoder buffer is equal to the average output rate (i.e., over a long time, the number of bits into the decoder buffer is equal to the number of bits out of the buffer, so there are no leftover bits in the buffer), and
2. The total transmission rate of programs is equal to the channel rate.

With the pre-settings of future transmission rates for the above two conditions, the upper and lower bounds for decoder buffer protection become measurable at the current frame instant. Advantageously, this allows decoder buffer protection to be managed at the encoding end.

Pre-compressed bitstreams may also be included in the rate control scheme.

Although the invention has been described in connection with various specific implementations, it should be appreciated that various adaptations and modifications can be made thereto without departing from the scope of the invention as set forth in the claims.

What is claimed is:

1. A method for coding data of a plurality L of video programs at a variable bit rate, comprising the steps of:
    allocating bits for coding the video programs according to a hierarchical scheme that includes at least: (a) a super group of pictures (GOP) level, wherein a super GOP comprises at least one GOP from each of the video programs, and has a length of N frames, and (b) a frame level; and
    for each program, setting a transmission rate for a respective current frame according to an average number of compressed bits for at least N previous frames, including a frame starting at N'+N−1 frames before a current frame, a frame ending at N' frames before the current frame, and intermediate frames therebetween;
    wherein N' is a decoding delay of a modeled decoder that receives a respective video program.

2. The method of claim 1, wherein:
    the hierarchical bit allocation scheme includes a super frame level between the super GOP level and the frame level; and
    each super frame comprises L pictures at a common frame instant, one from each video program.

3. The method of claim 1, wherein:
    for each program, the transmission rates for the respective current frame and N' future frames is predetermined at the time the current frame is coded.

4. The method of claim 1, wherein:
    for each program, said N previous frames are the frames that are most recently moved out of a buffer of the modeled decoder.

5. The method of claim 1, wherein:
    for each program, said N previous frames are the frames that are most recently moved out of a buffer of the modeled decoder at a start of a coding time of the current frame.

6. The method of claim 1, wherein:
    for each program, the transmission rate that is set results in an average input rate to a buffer of the modeled decoder that is equal to an average output rate thereof.

7. The method of claim 1, wherein:
    an aggregate of the transmission rates for the respective current frames of the video programs is maintained within a total available channel rate.

8. The method of claim 1, wherein:
    the video programs are communicated over a broadband communication network to a decoder population.

9. The method of claim 1, wherein:
    for each program, the transmission rate is set for the respective current frame according to an average number of compressed bits for N previous frames including said frame starting at N'+N−1 frames before the current frame, and said frame ending at N' frames before the current frame.

10. The method of claim 1, wherein:
    for each program, the transmission rate for the respective current frame is set according to an average number of compressed bits for an integer multiple of N previous frames.

11. The method of claim 1, wherein:
    the video programs that are coded comprise uncompressed and compressed video data.

12. The method of claim 1, wherein:

the video programs that are coded comprise uncompressed video data.

13. An apparatus for coding data of a plurality L of video programs at a variable bit rate, comprising:

means for allocating bits for coding the video programs according to a hierarchical scheme that includes at least: (a) a super group off pictures (GOP) level, wherein a super GOP comprises at least one GOP from each of the video programs, and has a length of N frames, and (b) a frame level; and means for setting a transmission rate for a respective current frame for each program according to an average number of compressed bits for at least N previous frames, including a frame starting at N'+N−1 frames before a current frame, a frame ending at N' frames before the current frame, and intermediate frames therebetween;

wherein N' is a decoding delay of a modeled decoder that receives a respective video program.

14. The apparatus of claim 13, wherein:

the hierarchical bit allocation scheme includes a super frame level between the super GOP level and the frame level; and each super frame comprises L pictures at a common frame instant, one from each video program.

15. The apparatus of claim 13, wherein:

for each program, the transmission rates for the respective current frame and N' future frames is predetermined at the time the current frame is coded.

16. The apparatus of claim 13, wherein:

for each program, said N previous frames are the frames that are most recently moved out of a buffer of the modeled decoder.

17. The apparatus of claim 13, wherein:

for each program, said N previous frames are the frames that are most recently moved out of a buffer of the modeled decoder at a start of a coding time of the current frame.

18. The apparatus of claim 13, wherein:

for each program, the transmission rate that is set results in an average input rate to a buffer of the modeled decoder that is equal to an average output rate thereof.

19. The apparatus of claim 13, wherein:

an aggregate of the transmission rates for the respective current frames of the video programs is maintained within a total available channel rate.

20. The apparatus of claim 13, wherein:

the video programs are communicated over a broadband communication network to a decoder population.

21. The apparatus of claim 13, wherein:

for each program, the transmission rate is set for the respective current frame according to an average number of compressed bits for N previous frames including said frame starting at N'+N−1 frames before the current frame, and said frame ending at N' frames before the current frame.

22. The apparatus of claim 13, wherein:

for each program, the transmission rate for the respective current frame is set according to an average number of compressed bits for an integer multiple of N previous frames.

23. The apparatus of claim 13, wherein:

the video programs that are coded comprise uncompressed and compressed video data.

24. The apparatus of claim 13, wherein:

the video programs that are coded comprise uncompressed video data.

* * * * *